US006677447B1

(12) United States Patent
Lee et al.

(10) Patent No.: US 6,677,447 B1
(45) Date of Patent: Jan. 13, 2004

(54) PROCESS FOR PREPARING HOMOGENEOUS CELLULOSE SOLUTION BY USING SUPERCOOLED LIQUID N-METHYLMORPHOLINE-N-OXIDE HYDRATE SOLVENT

(75) Inventors: Wha Seop Lee, Seoul (KR); Seong Mu Jo, Seoul (KR); Seok Gu Ko, Seoul (KR); Dong Bok Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 63 days.

(21) Appl. No.: 09/706,846

(22) Filed: Nov. 7, 2000

(30) Foreign Application Priority Data

Sep. 26, 2000 (KR) .......................... 2000-56462

(51) Int. Cl.$^7$ .......................... C08B 1/00; C08B 37/00; C07H 1/00
(52) U.S. Cl. .......................... 536/56; 536/124
(58) Field of Search .................. 536/56, 124

(56) References Cited

U.S. PATENT DOCUMENTS 6,153,003 A * 11/2000 Lee et al.

FOREIGN PATENT DOCUMENTS

CA          1251880 A1 *  3/1989
WO       WO-97/47790 A1 * 12/1997

* cited by examiner

*Primary Examiner*—James O. Wilson
*Assistant Examiner*—Everett White
(74) *Attorney, Agent, or Firm*—Rosenberg, Klein & Lee

(57) ABSTRACT

Disclosed is a process for preparing a homogeneous cellulose solution which is capable of, forming a mixture where a cellulose pulp powder is mixed and swollen with a liquid NMMO hydrate solvent supercooled under a melting point and subjecting the mixture to a dissolution treatment, thereby producing a homogeneous cellulose solution having a substantially low decomposition characteristic. The process produces a cellulose pulp mixing powder that is first swollen in a liquid NMMO solvent supercooled under a melting point by minimizing the dissolution of cellulose by the liquid NMMO solvent and maximizing the swelling thereof by the liquid NMMO solvent, thereby resulting in a maximum homogeneity of the solution and maintains the minimized decomposition states of the cellulose and the NMMO solvent, thereby resulting in the improvement of productivity and the simplicity of the process.

13 Claims, 7 Drawing Sheets

$T_m$: melting temperature
$T_{c1}$, $T_{c2}$, $T_{c3}$: crystallization temperature
L: liquid NMMO hydrate
$C_1$: NMMO hydrate being crystallized at 80 °C or more
$C_2$: NMMO hydrate being crystallized at 20 to 80 °C
$C_3$: NMMO hydrate being crystallized at 33 °C or less $T_m$: melting temperature $T_{c1}$, $T_{c2}$, $T_{c3}$: crystallization temperature L: liquid NMMO hydrate $C_1$: NMMO hydrate being crystallized at 80 °C or more $C_2$: NMMO hydrate being crystallized at 20 to 80 °C $C_3$: NMMO hydrate being crystallized at 33 °C or less A: dissolution region of cellulose B: irreversible swelling region of cellulose C: reversible swelling region of cellulose Dotted line: Divided line according to basic experiment Fine Solid line: crystallization temperature curve of NMMO hydrate (crystallization temperature at cooling rate per minute of 10 °C Block 1: supply section of pulp powder and liquid
        NMMO hydrate solvent rapidly cooled under
        melting point
Block 2: mixing and agitation section for
        producing cellulose-swollen mixture
Block 3: conveying and homogenizing section
Block 4: packaging and measuring section 1- melted NMMO pouring
2- NMMO injection nozzle
3- cooling air injection nozzle
4- discharging of liquid NMMO supercooled under melting point
5- cooling air pouring,
6- injected liquid NMMO 1- melted NMMO pouring 2- NMMO injection nozzle 3- cooling air ring injection nozzle 4- discharging of liquid NMMO supercooled under melting point 5- cooling air pouring 6- cooling air discharging 7- injected liquid NMMO 1- pulp powder pouring
2- twin-screw variable pitch screw supplier
3- compressed powder conveying
4- injection pouring of liquid NMMO supercooled under melting point
5- block 1 of twin-screw swollen-mixture producing machine

PROCESS FOR PREPARING HOMOGENEOUS CELLULOSE SOLUTION BY USING SUPERCOOLED LIQUID N-METHYLMORPHOLINE-N-OXIDE HYDRATE SOLVENT

BACKGROUND OF THE INVENTION

1. Field of the Invention

The present invention relates to a process for preparing a homogeneous cellulose solution and more particularly, to a process for preparing a homogeneous cellulose solution by forming a mixture where powdered cellulose pulp is mixed and swollen with a liquid N-methylmorpholine N-oxide (hereinafter, referred to as NMMO) hydrate solvent supercooled under its melting point, and by subjecting the mixture to a dissolution treatment, thereby producing a homogeneous cellulose solution having a substantially low decomposition characteristic which is used in a field manufacturing cellulose fibers or films, by an easy and fast method.

2. Description of the Related Art

An NMMO hydrate functions as a cellulose non-solvent (hereinafter, referred to as NMMO non-solvent), when it has a water content of about 18% or more by weight, thereby swelling cellulose, whereas as a cellulose solvent (hereinafter, referred to as NMMO solvent), when it has a water content of about 18% or less by weight, thereby dissolving cellulose.

Conventionally known processes for preparing cellulose solution by using NMMO solvent are as follows:

First, sheets of cellulose pulp are mixed and swollen with NMMO non-solvent having a water content of 22% by weight and then, an excess of water contained in the mixture is distilled and removed, thereby cellulose dissolves (For example, see U.S. Pat. No. 4,142,913, U.S. Pat. No. 4,144,080, U.S. Pat. No. 4,196,282 and U.S. Pat. No. 4,246,221). However, the above-mentioned processes should require distillation of the excess water under a reduced pressure in the presence of cellulose, thereby result in a large amount of energy consumption and a long time preparing solution. As a result, the processes suffer from problems that the decomposition of cellulose and the discoloration of NMMO are serious.

As another example, European Patent No. 356,419 discloses cellulose solution preparation process in which cellulose is swollen in a NMMO non-solvent having a water content of 40% by weight and then, an excess of water is distilled under a reduced pressure in a screw extruder on which a fan type flight is mounted. As yet another example, International Patent Application Publication No. WO 94/06530 discloses cellulose solution preparation process using a thin film evaporator as the pressure-reducing distiller. However, the above-referenced processes suffer from problems that the productivity thereof is low and the process and apparatus are complicated.

Second, sheets of pulp are swollen in a liquid NMMO solvent (having a water content of 15% by weight) at a temperature in the range of 85° C. to 95° C. over its melting point and the resulting mixture swirls and heats without any concentration process, thereby a cellulose solution was produced. This process is disclosed in U.S. Pat. No. 4,211,574. In this way, a gel film is undesirably formed on the surface of pulp sheet, which serves to inhibit the NMMO solvent from diffusing into the interior of pulp sheet, thereby the production of a homogeneous solution results in failure.

Third, cellulose powder and powdered NMMO solvent are simply mixed and dissolved by means of an extruder, thereby producing cellulose solution (For example, see SU 1645308 A1). In case the two components are mixed in large quantities, however, a part of cellulose powder remains at non-dissolved state in the produced solution, thereby the production of a homogeneous solution results in failure.

On the other hand, a solid NMMO solvent (whose melting point is 78° C.) at a room temperature and cellulose pulp pieces are thrown into a disintegration mixing mill and disintegrated to mix at a temperature in the range of 40° C. to 100° C., thereby pellet type mixing granules are produced. Next, the granules are supplied into an extruder to produce a cellulose solution. For example, this process is disclosed in U.S. Pat. No. 5,584,919. In this case, however, there occur some problems that it is difficult to manage solid NMMO solvent and thus to carry out continuous processes.

Fourth, International Patent Application No. PCT/KR97/00104 discloses a process preparing cellulose solution by a twin-screw extruder. A liquid NMMO solvent (whose melting point is 78° C.) at a temperature in the range of 90° C. to 100° C. is supplied into the first block of the twin-screw extruder, cooled in the second block at a temperature of 75° C. Then powdered pulp having an apparent diameter 180 mm is supplied into either the second block or third block at a temperature of 75° C., and mixed. A mixture produced is heated to a temperature of 120° C., while passing through the sections in order of transfer, agitation, melting, solution homogenization, defoaming and constant discharging. It is, however, in this process, found that the swelling and dissolution of pulp powder occur simultaneously during the transfer and agitation processes. In addition, the block receiving solvent and the block receiving pulp powder are different, so that the twin-screw extruder exhibits low efficiency to arrange at least 9–14 blocks (having a L/D 36–48). Furthermore, since pulp powder has an apparent specific gravity in the range of 0.04 to 0.08, it is conveyed only in small amount, thereby resulting in a low productivity.

As stated above, the conventionally known processes have disadvantages such as low homogeneity of produced cellulose solution, complicated processes and the like. To solve the disadvantages, it is desirable that a liquid NMMO solvent is diffused into the interior of pulp at a fast rate and thus swells the pulp, before cellulose is dissolved in the liquid NMMO solvent. At this time, it is preferable to minimize the dissolution of cellulose by the liquid NMMO solvent and to maximize swelling thereof by the liquid NMMO solvent.

SUMMARY OF THE INVENTION

Accordingly, it is an object of the present invention to provide a process for preparing a homogeneous cellulose solution which is capable of producing a cellulose-NMMO mixture where powdered cellulose pulp is first swollen in a liquid NMMO solvent supercooled under its melting point by minimizing the dissolution of cellulose by the liquid NMMO solvent and maximizing the swelling thereof by the liquid NMMO solvent. And thus produced powder of the mixture is subjected to a dissolution treatment, thereby producing a high homogeneous cellulose solution.

The liquid NMMO solvent is produced, for example, in such a method that a large amount of water is evaporated out of a NMMO water solution with a water content of 50% or more by weight under a reduced pressure and the resulting NMMO solution is concentrated. The production principle of the liquid NMMO solvent supercooled under its melting point from the concentrated NMMO solvent as cellulose solvent has close relation to thermal behavior of the NMMO hydrate solvent, that is, the melting behavior, and isothermal and non-isothermal crystallization behavior by cooling of NMMO hydrate solvent.

versus water content in NMMO hydrate, which is heated and cooled at a rate of 10° C. per minute. The dotted line denotes melting point $T_m$ of NMMO hydrate by the heating. The solid line denotes crystallization temperatures $T_{c1}$–$T_{c3}$ by the cooling. In this case, a few melting points and crystal-

TABLE 1

Thermal Behavior of NMMO Hydrate

| Water Content (% by weight) | Heating and Cooling Rate (5° C./min) | | | | | | Heating and Cooling Rate (10° C./min) | | | | | |
|---|---|---|---|---|---|---|---|---|---|---|---|---|
| | Tm (° C.) | | | Tc (° C.) | | | Tm (° C.) | | | Tc (° C.) | | |
| 22 | 42 | | | | | | 46 | | | — | | |
| 18 | 42 | | | 60 | | | 5 | 45 | | | 63 | | | 5 below zero |
| 15 | 39 | | | 77 | | | 21 | 41 | | | 78 | | | 7 |
| 13.3 | | 78 | | | | | 25 | | 80 | | | 20 | |
| 12 | 78 | — | 95 | 105 | 30 | — | 72 | — | 85 | 102 | — | 33 | 73 | — |
| 11 | 76 | 89 | 97 | 113 | 31 | — | 82 | — | 87 | 103 | 125 | 30 | 77 | 85 |
| 8 | 75 | 90 | 97 | 130 | 30 | 79 | 97 | 78 | 90 | 103 | 135 | 30 | 78 | 99 |
| 6 | 75 | 90 | 95 | 141 | 27 | 80 | 113 | 77 | 92 | 103 | 148 | 27 | 79 | 118 |
| 3 | 74 | 90 | 99 | 156 | — | 80 | 127 | 77 | 93 | 104 | 177 | — | 80 | 139 |
| 0 | [74] | — | 103 | 180 | — | 80 | 140 | [75] | — | 105 | 183 | — | 81 | 143 |

Tm: melting point (observed by heating from 0° C.)
Tc: crystallization temperature (observed by cooling from a maximum melting temperature to 20° C. below zero).
[ ]: slight thermogram Table 1 shows thermal behavior of NMMO hydrate produced by subjecting 50% by weight of NMMO water solution made by BASF Co. to pressure reduction, distillation and concentration (An accurate water content in NMMO hydrate was measured by using Karl-Fischer method. Every sample was prepared by sealing a sample in amount of 25 mg to 35 mg in a stainless steel capsule (Perkin-Elmer part 319-0218). Heating and cooling rates were respectively both 5° C./min and 10° C./min under a nitrogen atmosphere, using DSC 7 (which is a trade name and made by Perkin-Elmer Co.).

According to Table 1, on the basis of NMMO hydrate having a water content of 13.3% by weight (hereinafter, referred to as NMMO monohydrate), if heating and cooling rates are respectively increased from 5° C. to 10° C. per minute for NMMO hydrate having a water content of 15% to 22% by weight more than NMMO monohydrate, the value of melting point is increased and crystallization temperature is decreased. This generally appears in the measurement of DSC. However, if heating and cooling rates are respectively increased from 5° C. to 10° C. per minute for NMMO hydrate having a water content of 0% to 12% by weight less than NMMO monohydrate, the value of melting point is increased and crystallization temperature is also increased. When NMMO hydrate solvent is made by the concentration, NMMO monohydrate has a crystal transition to anhydrous NMMO in accordance with the reduction of water content, thereby the transition probably gives affection on the thermal characteristic. Anhydrous NMMO is produced by sublimation of NMMO monohydrate, and at this process, NMMO monohydrate whose melting point is 78° C. exhibits the crystal transition to anhydrous NMMO. This appears in NMMO hydrate having a water content less than 13.3% by weight, and specifically, NMMO hydrate having a water content in the range of 13.3% by weight to 11% by weight exhibits slightly different thermal characteristics due to instable crystal transition properties. The characteristics shown in Table 1 are also apparent to FIG. 1. FIG. 1 is a graph illustrating melting and crystallization temperatures lization temperatures are obtained, dependent upon water content in NMMO hydrate. The symbol 'L' represents liquid region of NMMO hydrate, and the symbols '$C_1$, $C_2$ and $C_3$' represent crystalline regions divided from the crystallization temperature appearing when molten NMMO hydrate is cooled. If NMMO hydrate having a water content in the range of 13.3% by weight to 22% by weight is melted and heated to 140° C., and then cooled, the crystallization in the NMMO hydrate occurs at the region $C_3$ at a temperature in the range of 0° C. to 20° C. NMMO monohydrate having the water content of 13.3% by weight has melting point of 80° C. at a heating rate of 10° C./min, and if it is melted and heated to 140° C., and then cooled at a cooling rate of 10° C./min, the crystallization of NMMO monohydrate occurs at the region $C_3$ at a temperature of 20° C. In case of NMMO hydrate having a water content of 8% by weight, the crystallization of the NMMO hydrate occurs at the region $C_1$ at a temperature of 80° C. or more, at the region $C_2$ at a temperature in the range of 20° C. to 80° C., and at the region $C_3$ at a temperature of 33° C. or less. If NMMO hydrate having a water content in the range of 13.3% or less by weight to 3% by weight is heated, a few melting points appear according to the water content from the temperature of 80° C., as shown in Table 1. If the NMMO hydrate is heated to a temperature where it is fully melted and then cooled, a few crystallization peaks appear according to the water content thereof. In case of the cooling rate of 10° C./min, the first crystallization of the NMMO hydrate occurs at a temperature in the range of 85° C. to 143° C. (the region $C_1$ in FIG. 1), and if the cooling treatment is continuously carried out, the second crystallization of the liquid NMMO hydrate which has not been crystallized in the region $C_1$ occurs at a temperature in the range of 73° C. to 81° C. (the region $C_2$ in FIG. 1) and the third crystallization occurs at a temperature in the range of 27° C. to 33° C. (the region $C_3$ in FIG. 1).

When NMMO hydrate is heated over its melting point and then cooled, it maintains liquid state during a predetermined time until its crystallization occurs. The liquid maintaining time is different, dependent upon the cooling rate of the melted NMMO hydrate. FIG. 2 is a graph illustrating non-isothermal crystallization behavior when NMMO monohydrate having a water content of 13.3% by weight is cooled at a cooling rate in the range of 10° C./min to 200° C./min at the melted state of 90° C., by using DSC.

Table 2 shows crystallization temperatures according to the variation of cooling rate for melted NMMO hydrate solvents having the water contents of 13.3% by weight and 8% by weight.

TABLE 2

Non-isothermal Crystallization Behavior of NMMO Hydrate

| Cooling rate (° C./min) | 86.7% by weight of NMMO Tc (° C.) | 92% by weight of NMMO Tc (° C.) | |
|---|---|---|---|
| 10 | 29 | 30 | 78 99 |
| 20 | 26 | 28 | 78 95 |
| 30 | 24 | 25 | 83 |
| 40 | 22 | 23 | 78 |
| 50 | 22 | 22 | 75 |
| 60 | 20 | 22 | |
| 70 | 20 | 21 | |
| 80 | 20 | 20 | |
| 90 | 20 | 20 | |
| 100 | 20 | 19 | |
| 200 | 20 | 17 | |

Tc: crystallization temperature
(86.7% by weight of NMMO: observed by cooling from 95° C. to 20° C. below zero)
(92% by weight of NMMO: observed by cooling from 135° C. to 20° C. below zero)

In case of the cooling rate in the range of 10° C./min to 200° C./min, monohydrate has crystallization temperatures in the range of 29° C. to 20° C. That is, in case of the cooling rate of 10° C./min, NMMO monohydrate has crystallization temperature difference value of 9° C. when compared to that (the crystallization temperature of 20° C.) in Table 1. This is because of the difference between thermal history appearing at the time when maximum heating temperatures for obtaining the melted material are 95° C. (see Table 2) and 80° C. (see Table 1). On the other hand, if NMMO hydrate having a water content of 8% by weight is heated to a temperature of 135° C. and then cooled, increase of a cooling rate in the range of 10° C./min to 200° C./min resulted in decrease of crystallization temperature. Unlike NMMO monohydrate, NMMO hydrate having the water content of 8% by weight exhibits crystallization at temperatures of 30° C., 78° C. and 99° C., respectively, at the cooling rate of 10° C./min. As the cooling rate is increased, crystallization temperature becomes gradually low, and at the cooling rate of 60° C./min or more, the crystallization occurring at the temperatures of 78° C. and 99° C. disappears, so that only a single non-isothermal crystallization temperature is observed. This is because crystallization of the NMMO hydrate does not occur at the temperatures of 78° C. and 99° C. and uniformly occurs at a low temperature of 22° C. or less, if the cooling rate is increased to 60° C./min or more. Therefore, in case of the NMMO hydrate having a water content of 8% by weight, if it is fully heated to its melting point of 135° C. and rapidly cooled at a cooling rate of 60° C./min or more, the liquid NMMO solvent supercooled even at a temperature of 22° C. or less can be produced.

The liquid maintaining time of NMMO solvent supercooled at a predetermined temperature can be observed from isothermal crystallization behavior where NMMO hydrate is heated over its melting point or more and then rapidly cooled to a predetermined temperature. Table 3 shows liquid maintaining time (crystallization time at a predetermined temperature) of NMMO monohydrate (whose melting point is 78° C.) melted and heated to a temperature of 95° C. Then NMMO monohydrate is cooled at cooling rates of 20° C./min and 200° C./min, respectively, from 95° C. to predetermined temperatures, which are maintained until crystallization of NMMO monohydrate occurs. In case of the cooling rate of 20° C./min, when predetermined supercooling temperatures are 30° C., 35° C., 37.5° C., 38.5° C., 40° C. and 45° C. under its melting point, liquid maintaining time is 2 seconds, 10 seconds, 15 seconds, 27 seconds, 38 seconds and 38 seconds or more, respectively. In case of the cooling rate of 200°/min, at the same supercooling temperatures as those in the above, liquid maintaining time is 12 seconds, 48 seconds, 55 seconds, 217 seconds, 1800 seconds, and 1800 seconds or more, respectively. Specifically, in case of the cooling rate of 200° C./min, if the supercooling temperatures are maintained at 40° C., the liquid state is kept even over 1800 seconds.

TABLE 3

Isothermal Crystallization Behavior of NMMO Monohydrate

| Temperature Maintaining | Crystallization Time (second) | |
|---|---|---|
| supercooling (° C.) | Cooling Rate (20° C./min) | Cooling Rate (200° C./min) |
| 30 | 2 | 12 |
| 35 | 10 | 48 |
| 37.5 | 15 | 55 |
| 38.5 | 27 | 217 |
| 40 | 38 | 1800 seconds or more |
| 45 | 38 seconds or more | 2 |
| 50 | 2 | 2 |
| 65 | 2 | 2 |

NMMO monohydrate (water content of 13.3% by weight, and melting point of 78° C.)

Crystallization time: the time maintaining liquid phase at a given temperature below 78° C. after molten NMMO monohydrate at 95° C. is supercooled at a cooling rate.

FIG. 3 is a graph illustrating partly phase change behavior of cellulose on the supercooled liquid region of NMMO hydrate solvent, based upon basic experiments as will be described below. At a temperature of 65° C. or more which NMMO hydrate is supercooled and maintained in liquid state, the region 'A' where cellulose is dissolved is formed; at a temperature in the range of 50° C. to 65° C., the region 'A+B' where cellulose is dissolved and swollen in a irreversible manner is formed; and at a temperature of 50° C. or less, the region 'B' where cellulose is swollen in a irreversible manner and the region 'C' where cellulose is reversibly swollen are formed. Since a gel film is formed on a surface of pulp powder in the cellulose dissolution region (the region 'A'), it is difficult to produce a homogeneous solution or even if the solution is produced, there are needs for a strong shearing force and time consumption. In the region 'A+B', where dissolution and irreversible swelling of cellulose co-exist, it is possible to produce the solution in an easier manner than that in the region 'A', but there is a need for a predetermined shearing force, which may result in decomposition of the solution. In the region 'B', where the irreversible swelling of cellulose occurs, cellulose is not dissolved, but swollen, so that the productivity of pulp powder swollen can be high due to consumption of a minimum shearing force and the shortest time. The resulting cellulose NMMO solution becomes a high homogenous solution where decomposition thereof is reduced at a minimum. In the region 'C', where the reversible swelling of cellulose occurs, the water content of NMMO hydrate is high and thus, a degree of dissolution of cellulose becomes low, thereby making it difficult to produce cellulose solution having a high concentration. However, if cellulose is swollen and heated even on the hatched portion in the region 'C' as the reversible swelling region, cellulose solution can be produced.

As can be appreciated from the above, in the thermal behavior of NMMO hydrate solvent having a water content in the range of 8% by weight to 18% by weight that is produced by concentrating 50% by weight of aqueous NMMO solution, if NMMO hydrate solvent is melted and then rapidly cooled to a predetermined temperature, it is kept at a supercooled liquid state during a substantially long time period even at a temperature under its melting point, so that the liquid NMMO hydrate solvent is diffused into the interior of pulp powder and thus serves to swell cellulose, while minimizing dissolution of cellulose.

Based upon the above-discussed contents, therefore, according to the features of the present invention, NMMO hydrate solvent having a water content in the range of 8% by weight to 18% by weight, preferably NMMO hydrate solvent having a water content in the range of 8% by weight to 14% by weight is melted and then supercooled to a low temperature under its melting point and in the region where the dissolution and swelling of cellulose co-exist, preferably in the region where the swelling of cellulose exists, the dissolution of cellulose becomes minimized and the swelling thereof becomes maximized, so that the supercooled liquid NMMO solvent is easily diffused into the interior of pulp powder, thereby producing the swollen mixture and hence, the resulting mixture is heated and dissolved, thereby finally producing a high homogeneous cellulose solution.

To accomplish this and other objects of the present invention, there is provided a process for preparing a homogeneous cellulose solution by using a molten NMMO hydrate solvent, the process comprising the steps of: subjecting the molten NMMO hydrate solvent to a fast cooling process to place the NMMO hydrate solvent in a supercooled state, the supercooled state being under its melting point; and mixing the supercooled liquid NMMO hydrate solvent with powdered cellulose pulp and swelling the resulting mixture.

DETAILED DESCRIPTION OF THE PREFERRED EMBODIMENTS

An explanation of the process of preparing a high homogeneous cellulose solution according to the present invention will be in detail discussed with reference to FIGS. 4 to 7.

Figure 4:
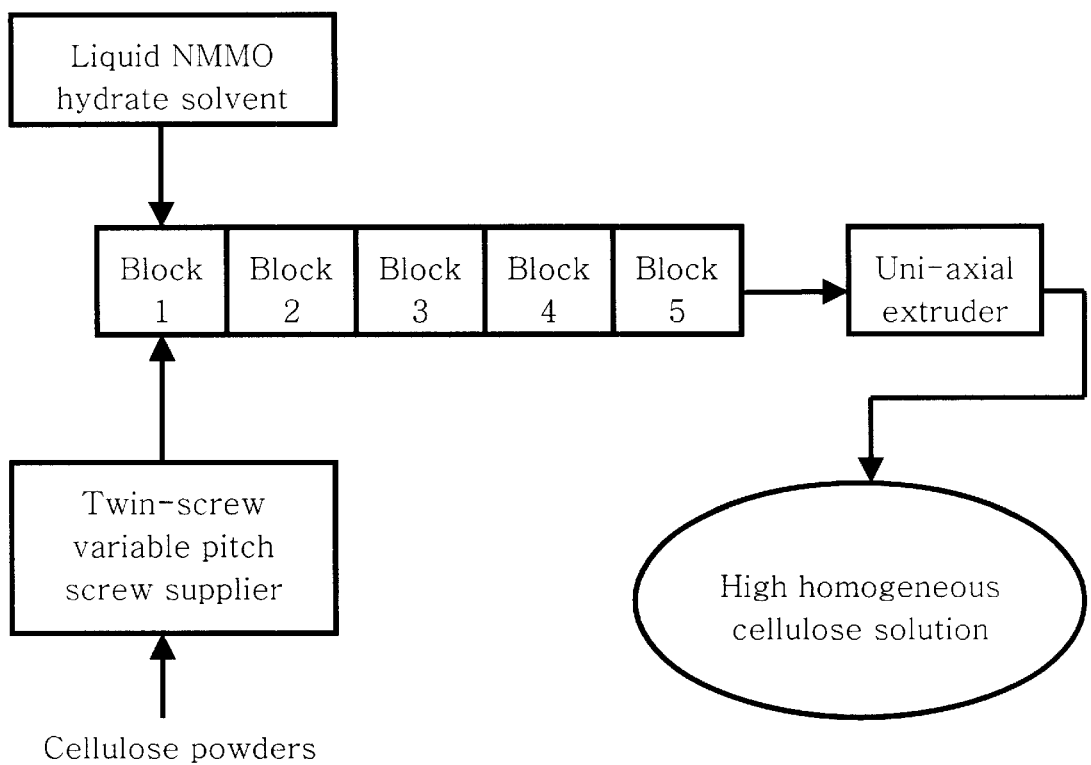
FIG. 4 is a block diagram illustrating a process of preparing a homogeneous cellulose solution by way of a twin-screw mixer with 5 blocks producing a swollen cellulose mixture.

FIG. 4 shows a process of preparing a high homogeneous cellulose solution according to the present invention. As shown, a twin-screw mixer producing a swollen cellulose mixture (which is composed of at least five blocks) has the similar structure and function to a twin-screw extruder and treats NMMO hydrate solvent and pulp powder in order of mixing, agitation and conveying, thereby producing the swollen mixture. The cellulose swollen mixture is continuously supplied into an uni-axial extruder, thereby producing a high homogeneous cellulose solution.

Figure 7:
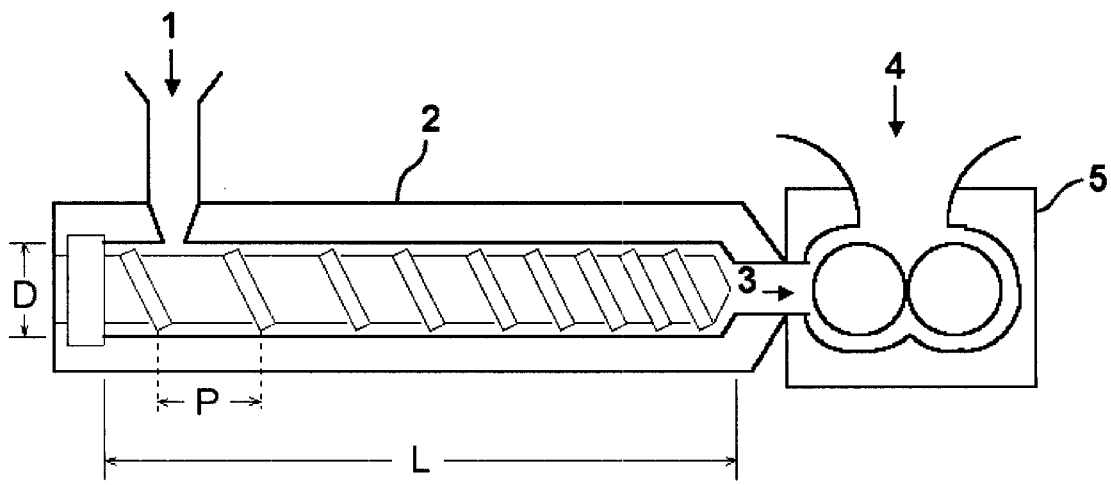
FIG. 7 is a schematic view illustrating a twin-screw supplier with variable pitch for compressing and supplying pulp powder.

The supercooled liquid NMMO hydrate solvent is injected at a predetermined rate to the top end of the first block of a twin-screw mixer (whose diameter and L/D are 60 mm and 20, respectively). Pulp powder is compressed, as shown in FIG. 7, at a twin-screw supplier with variable pitch (whose diameter, L/D and initial P/D are 45 mm, 7 and 1.5, respectively) whose pitch interval 'P' is decreased in a convey advancing direction and as a result, the apparent specific gravity of powdered pulp is increased. Then, pulp powder having the adjusted apparent specific gravity is supplied to the side of the first block of a twin-screw mixer. The liquid NMMO hydrate solvent supercooled is mixed with pulp powder in the second block, where pulp powder is thoroughly mixed and swollen. The mixture thereof becomes homogeneous slurry powder in the third and fourth blocks. The mixture is packaged or measured out in the fifth block. The temperature of the entire sections of the twin-screw mixer is preferably 65° C., more preferably 50° C., further preferably 45° C. in order to form the conditions of the region 'A+B' of FIG. 3 where the dissolution and swelling of cellulose co-exist, preferably the conditions of the region 'B' where the swelling of cellulose occurs.

When compared with a general twin-screw extruder (whose L/D is in the range of 35 to 48 or more) used for producing a homogeneous cellulose solution, the twin-screw machine used in the present invention has an extremely smaller L/D than general L/D, but exhibits the productivity of about 10 times that of the general twin-screw extruder having the same diameter. Therefore, the twin-screw machine producing the swollen mixture used in the present invention has desirably the L/D in the range of 15 to 35, more desirably in the range of 15 to 25 from the viewpoint of the productivity and homogeneity. The swollen mixture which has passed through the twin-screw mixer is packaged or continuously conveyed to a single-screw extruder used generally and then dissolved, thereby being converted into a cellulose solution for producing cellulose fibers or film.

The NMMO hydrate solvent used for swelling powdered cellulose pulp has a water content of desirably in the range 8% to 18%, more desirably in the range of 8% to 14%. This is produced by subjecting 50% by weight of NMMO water solution to a pressure-reducing and distilling treatment, thereby removing a large amount of water. The NMMO hydrate solvent is heated and melted and then, rapidly cooled desirably under 65° C., more desirably 50° C., which becomes supercooled to a low temperature liquid.

Figure 5:
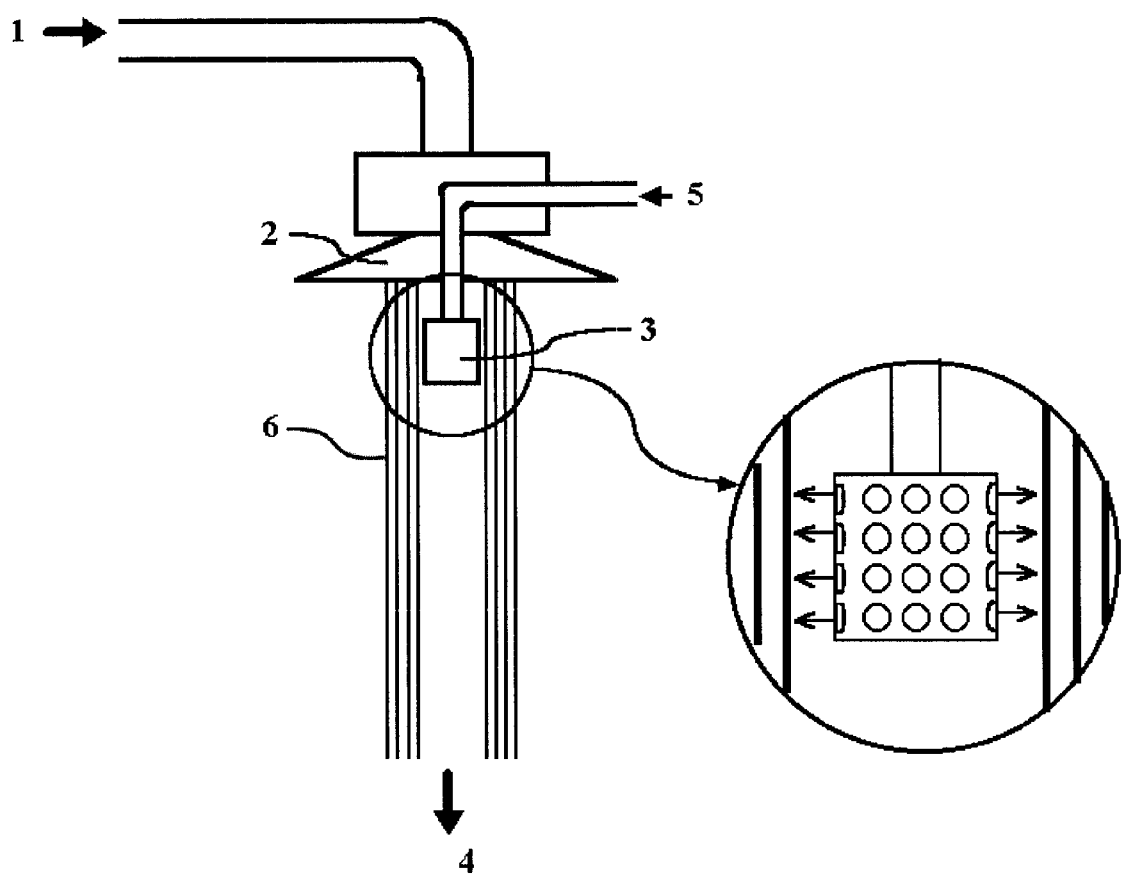
FIG. 5 is a schematic view illustrating main parts of the first equipment (cooling air injection type at the center) for the preparation of liquid NMMO hydrate solvent supercooled under its melting point.
Figure 6:
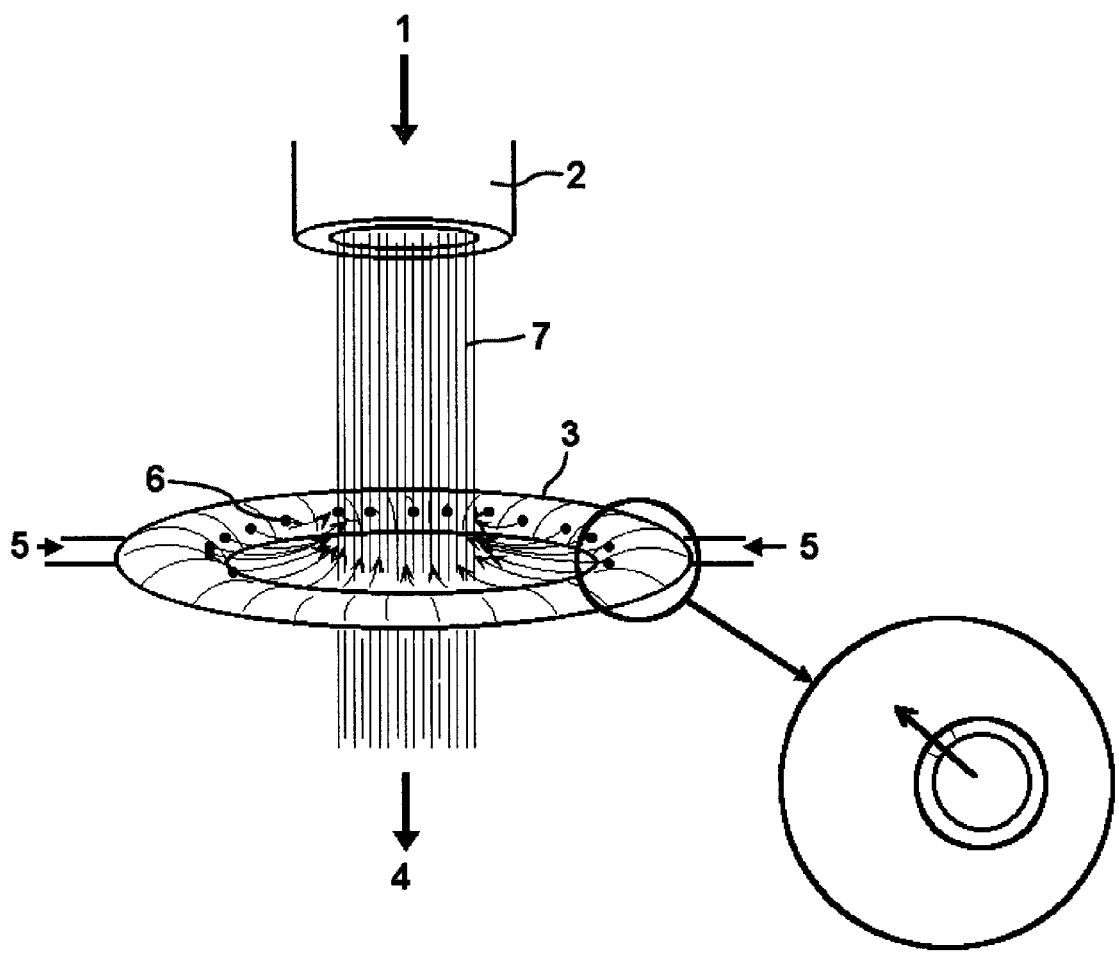
FIG. 6 is a schematic view illustrating the main parts of the second equipment (cooling air injection type at the outside) for the preparation of liquid NMMO hydrate solvent supercooled under its melting point.

There are several methods for supercooling the melted NMMO hydrate solvent, parts of which are shown in FIGS. 5 and 6 in order to understand the concept of producing the supercooled liquid NMMO hydrate solvent.

In FIG. 5, the cooling air stream is injected at the center of sprayed stream of molten NMMO hydrate solvent, and in FIG. 6, injected from the outside of sprayed stream of the molten solvent.

Also, the liquid maintaining time of the supercooled NMMO solvent is different, dependent upon water content and cooling rate, as noted in the above.

Figure 1:
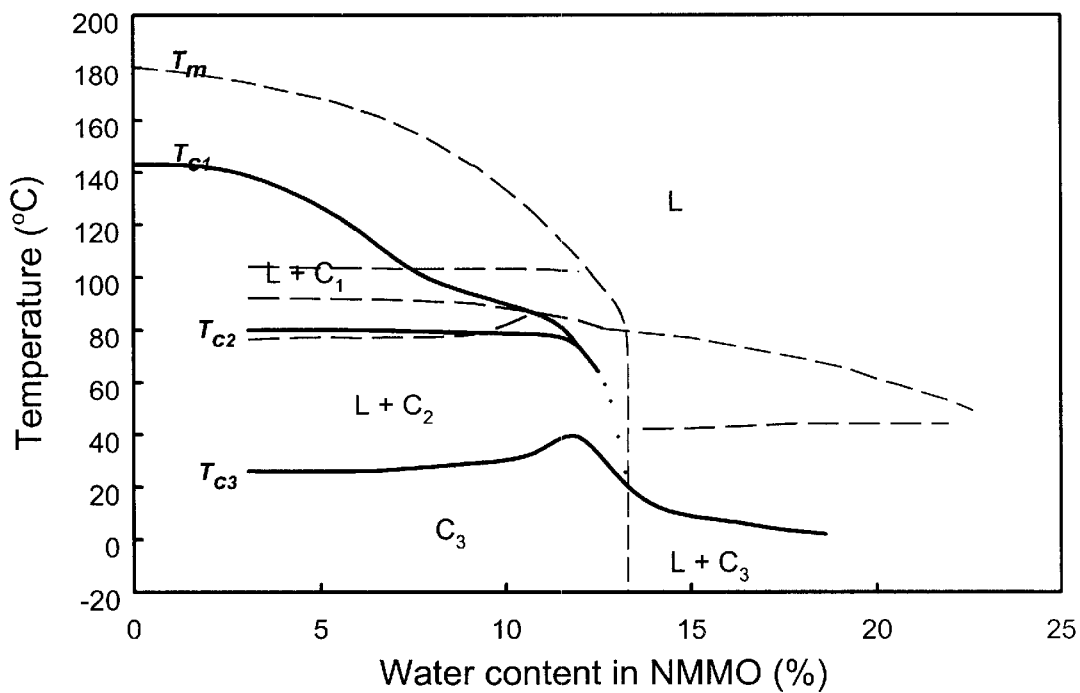
FIG. 1 is a graph illustrating thermal behavior (heating and cooling rate 10° C./min) of NMMO hydrate.
Figure 2:
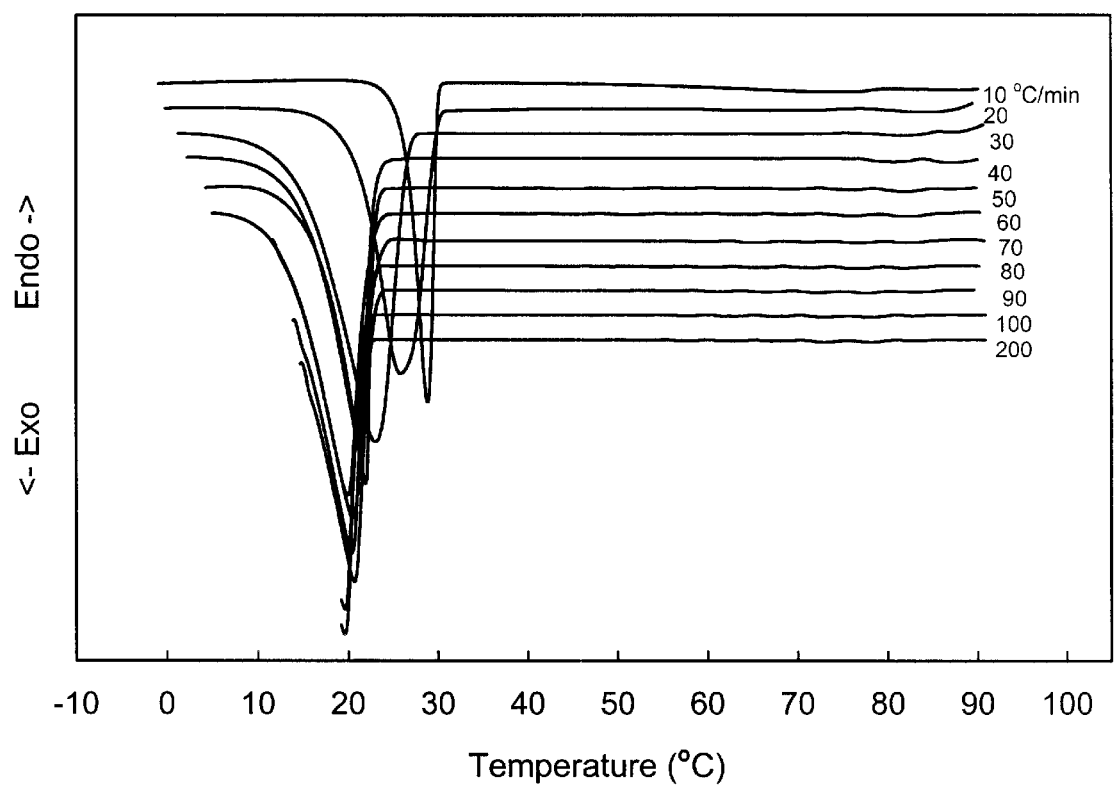
FIG. 2 is a graph illustrating non-isothermal crystallization behavior (cooling from the melting state of 95° C.) according to cooling rate of NMMO monohydrate (having a water content of 13.3% by weight)

The NMMO hydrate solvent having a water content of 13% or less by weight has various melting points (refer to Table 1 and FIG. 1), but if it is melted and then rapidly cooled at a cooling rate of 60° C./min, no crystallization occurs at the $T_{c1}$ and $Tc_2$ of FIG. 1. In this case, crystallization occurs at a temperature of about 25° C., thereby producing the liquid NMMO supercooled to the temperature of 50° C. or less at which the dissolution of cellulose is minimized and the swelling thereof is maximized.

If NMMO hydrate solvent having a water content of 13% or more by weight is rapidly cooled at a cooling rate of 20° C./min or more, crystallization occurs at a temperature of about 30° C., thereby producing the liquid NMMO supercooled to the temperature of 50° C. or less at which the dissolution of cellulose is minimized and the swelling thereof is maximized. Therefore, after NMMO hydrate solvent is completely melted, in order to produce the liquid NMMO solvent supercooled to desirably a temperature of 65° C. or less, more desirably a temperature of 50° C. or less, the rapid cooling rate should be set preferably at the cooling rate of 20° C./min or more (in case of NMMO hydrate solvent having a water content of 13% or more by weight), more preferably at the cooling rate of 60° C./min or more (in case of NMMO hydrate solvent having a water content of 13% or less by weight) and then, the supercooled liquid NMMO solvent is supplied into the first block of the twin-screw machine producing the swollen mixture.

As described above, if NMMO hydrate solvent is heated over its melting point or more and then supercooled to a temperature under its melting point, it maintains its liquid state during a predetermined time period. The supercooled liquid maintaining time is also dependent upon the temperature of pulp powder supplied into the side of the first block of the twin-screw mixer. In order to reduce an amount of dried cooling airflow used for rapid cooling molten NMMO hydrate solvent, it is desirable that the temperature of pulp powder is set as low as possible. Hence, the temperature of pulp powder is kept preferably at a temperature range of a room temperature to 50° C., more preferably a temperature range of a room temperature to 40° C.

Cellulose of the present invention is used as powdered pulp produced by milling every sheet of pulp by a knife-edged blade mill on which a ring sieve is mounted. The apparent specific gravity of normal pulp sheet is 0.8, and if normal pulp is powdered, the average diameter and apparent specific gravity of powder produced are different, dependent upon kind of a tree. For instance, even if the condition of the milling is the same, the average diameter and apparent specific gravity of powdered pulp of a needle-leaf tree are 50 mm and 0.08, respectively, and the average diameter and apparent specific gravity of powdered pulp of a broadleaf tree are 16 mm and 0.05, respectively.

If the apparent diameter of pulp powder is larger than 1000 mm, diffusion of the supercooled NMMO hydrate solvent into the interior of powdered pulp without any dissolution of cellulose, consumes much time. It is, therefore, desirable that the diameter of powdered pulp is 1000 mm or less. In correspondence with the diameter of powdered pulp, if the apparent specific gravity of pulp powder is under 0.05, the diameter of pulp is extremely small, so that it is liable to be exploded and the volume is greatly large. So, the conveying efficiency becomes low. Therefore, in order to enhance the conveying efficiency with the increment of the apparent specific gravity of pulp powder, there should be provided a twin-screw supplier with variable pitch for compressing and conveying pulp powder, as shown in FIG. 7. If pulp powder having the apparent specific gravity of 0.05 is compressed over 0.5, there is a possibility that the supercooled liquid NMMO hydrate solvent is not well diffused into the interior of pulp powder. Therefore, it is desirable that the apparent specific gravity of pulp powder is compressed desirably in the range of 0.1 to 0.5 or less, more desirably in the range of 0.1 to 0.4.

The present invention will be more in detail described by basic experiments, preliminary experiments and preferred embodiments, which of course do not limit the true spirit and scope of the invention. The characteristics of the swollen mixture and a cellulose solution produced in the embodiments are evaluated as follows:

1. Cellulose Structure Analysis

Cellulose pulp powder used has cellulose I structure. If pulp powder is dissolved and swollen in an irreversible region by NMMO hydrate solvent, it is changed from cellulose I structure to cellulose II structure. To check this structure change, cellulose was collected from the swollen mixture and the dissolved solution that were passed through the twin-screw machine producing the swollen mixture and the single-screw extruder connected thereto, and X-ray irradiation on the collected cellulose was then carried out. An apparatus for X-ray irradiation was employed with 'MX18 X-ray Diffractometer made by MAC science Co. Under the measuring conditions of 45 kV and 250 mA, cellulose was subjected to scanning per minute of 1° with CuK array (1=1.5405) that was passed through a nickel filter, thereby obtaining a diffraction pattern.

2. Weight-average Degree of Polymerization (DPw) of Cellulose

The variation of molecular weight of cellulose caused by dissolution of cellulose in the production of solution was measured as follows: The intrinsic viscosity of cellulose was measured at a concentration in the range of 0.1 g/dl to 0.6 g/dl at a temperature of 25±0.01° C. by using a Ubbelohode viscometer No. 1 (made by Fisher Corporation) and 0.5 M Cuene (Cupriethylenediamine) solution produced according to ASTM D539-51T. The intrinsic viscosity [IV] of the sample was calculated from the concentration 'C' and specific viscosity '$h_{sp}$', based upon the following equation (1). The weight-average degree of polymerization 'DPw' was calculated from the obtained specific viscosity [IV], based upon a Mark-Houwink equation as given by the following equation (2) (refer for example to M. Marx, Makromol. Chem., 16, 157(1995); J. Brandrup, E. H. Immergut, Polymer Handbook, 3rd ed., Vol. 144, Wiley-Interscience, New York, 1989).

$$[IV] = \lim_{C \to 0} [h_{sp}/C] \qquad (1)$$

$$[IV] = 0.98 \times 10^{-2} \, DP_W{}^{0.9} \qquad (2)$$

3. Concentration of Color Impurity

The discoloration of NMMO solvent caused by production of cellulose solution was measured by 30% by weight of NMMO water solution. 10 g of Cellulose solution in NMMO was immersed into distilled water for 60 minutes. The coloring impurity contained in NMMO solution was measured at a light absorption density of 450 nm by using a ultraviolet visibility spectral analyzer (which has a trade name, Hewlett Packard Model HP8453). Its result was indicated as amine oxide optical density (AOOD), which means the light absorption density of 1% by weight of NMMO solution at 450 nm. The AOOD of the 50% by weight of NMMO water solution (BASF Co.) was 0.0006.

4. Homogeneity of Cellulose Solution

The homogeneity of a cellulose solution was evaluated in accordance with as to whether cellulose particles exist or not in the solution. A cellulose solution was obtained by dissolving a swollen cellulose mixture, which was produced in the twin screw mixer, in a single-screw extruder. The temperature distribution of the single screw extruder (whose diameter and L/D was 120 mm and 30, respectively) was set as a solid phase moving region of 60° C., a dissolution region of 90° C., a dissolution moving region of 100° C. and a die region of 100° C. The safety limit pressure at front end of release region of the single screw extruder was set as 70 atm., and the number of rotation per minute of the screw was 150. A cellulose solution was observed on discharging from the single extruder, and cellulose particles undissolved were evaluated by a Nikon polarizing microscope, Type 104.

Basic Experiment: Swelling and Dissolution Behavior of Cellulose

Figure 3:
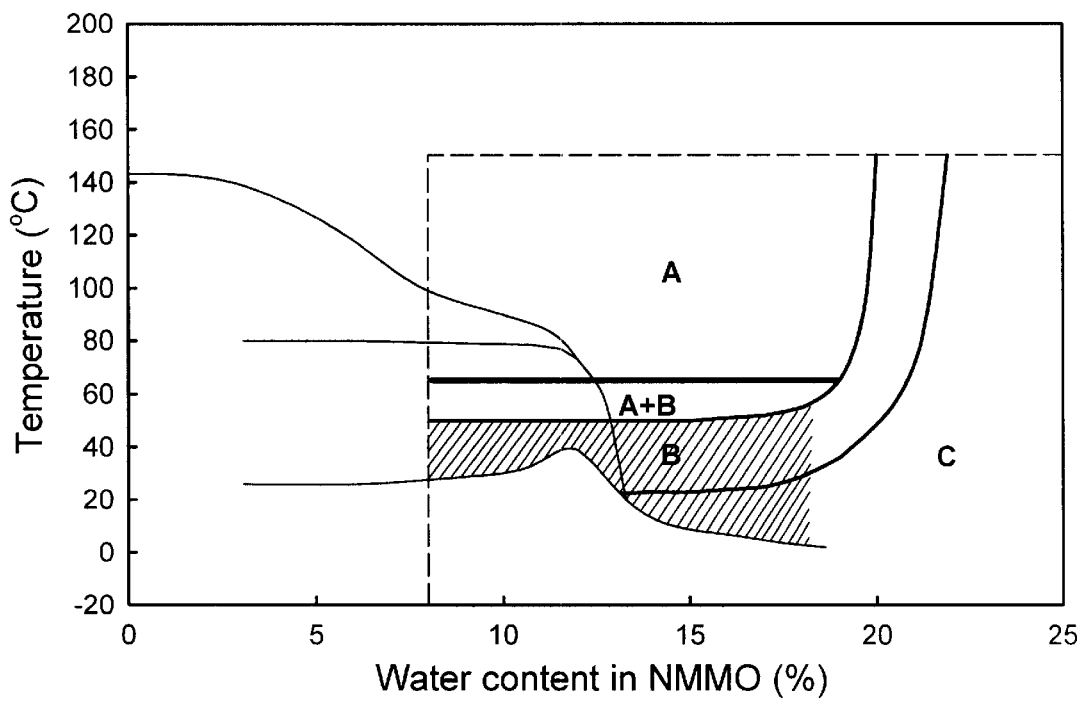
FIG. 3 is a graph illustrating partly phase change behavior of cellulose.

Contact test of pulp powder and a liquid NMMO hydrate solvent supercooled was carried out to obtain data for the partly phase variation of cellulose, as shown in FIG. 3 and to find the region where cellulose was not dissolved but swollen by a liquid NMMO hydrate solvent supercooled under its melting point, by Nikon polarizing microscope, Type 104 on which a hot stage (Mettler Toledo FP900) was attached. If a molten NMMO hydrate was supercooled to a temperature under its melting point, it was kept at the liquid state until its crystallization occurred. During the liquid maintaining time, pulp powder was swollen by the liquid NMMO solvent supercooled. The swelling and dissolution behavior of cellulose by the NMMO hydrate were dependent upon water contents of the NMMO hydrate. The dissolution and swelling behavior of cellulose at a temperature of melting point or more of NMMO hydrate were reported by conventional known processes (refer for example to U.S. Pat. No. 4,196,282, H. Chanzy, et al., J, Appl. Polym. Sci.; Appl. Polym. Symp., 37, 239 (1983).

However, the basic experiments of the present invention were carried out for the swelling behavior of cellulose by the liquid NMMO hydrate under supercooled conditions where the NMMO hydrate was not crystallized and existed at a liquid state. The dissolved and swollen cellulose by the NMMO hydrate was divided into three regions, as shown in FIG. 3. The region 'A' was cellulose dissolution region, the region 'B' was irreversible cellulose swollen region, and the region 'C' was reversible cellulose swollen region. In case of cellulose in the dissolution and irreversibly swollen regions from which the NMMO solvent was removed, the cellulose had cellulose II structure, but in case of cellulose in the reversibly swollen region from which the NMMO solvent was removed, the cellulose had cellulose I structure. In the basic experiments, respective cellulose structures were checked by the X-ray diffraction analysis.

Basic Experiment 1

NMMO hydrate solvents having water contents of 13%, 17% and 20% by weight were respectively heated and melted at their melting points, rapidly cooled at a cooling rate of 20° C./min and then kept at a temperature of 30° C. Next, cellulose pulp powder (Sai-Lyo, Sappi, DPw 1050) at a room temperature in the range of 20° C. to 25° C. was supplied into the respective NMMO solvents. It was found that while pulp powder was met with the respective liquid NMMO hydrate solvents and expanded, the supercooled liquid NMMO hydrate solvent having a water content of 13% by weight became first crystallized, so that further swelling of pulp powder did not occur. It was, on the other hand, found that the supercooled liquid NMMO hydrate solvents having water contents of 17% by weight and 20% by weight made cellulose somewhat swollen and became crystalline after elapsing of about 15 seconds.

Basic Experiment 2

Pulp powder preheated to 30° C. was supplied into the respective supercooled liquid NMMO solvents kept at 30° C. that were the same as Basic experiment 1. It was found that the expansion degree of the preheated pulp powder was higher than that of the pulp powder in Basic experiment 1 and the NMMO solvents became crystallized after elapsing of about 30 seconds.

Basic Experiment 3

NMMO hydrate solvents having water contents of 8%, 10.5%, 13%, 17% and 19% by weight were respectively heated and melted at their melting points, rapidly cooled at a cooling rate of 20° C./min and then kept at 40° C. Next, cellulose pulp powder at a room temperature was supplied into the respective liquid NMMO hydrate solvents supercooled. It was found that while pulp powder was met with the respective liquid NMMO hydrate solvents and expanded, the respective liquid NMMO hydrate solvents became crystallized within about 20 seconds and further swelling of pulp powder did not occur.

Basic Experiment 4

Pulp powder preheated to 40° C. was supplied into the respective supercooled liquid NMMO solvents kept at 30° C. that were the same as Basic experiment 3. It was found that the expansion degree of the preheated pulp powder was higher than that of the pulp powder in Basic experiment 3 and the NMMO solvents became crystallized after elapsing of about 35 seconds.

Basic Experiment 5

NMMO hydrate solvents having water contents of 8%, 10.5%, 13%, 17% and 19% by weight were respectively heated and melted at their melting points, rapidly cooled at a cooling rate of 200° C./min and then kept at 40° C. Next, cellulose pulp powder at a room temperature was supplied into the respective liquid NMMO hydrate solvents supercooled. It was found that while the pulp powder was met with the respective liquid NMMO hydrate solvents and expanded, the respective liquid NMMO hydrate solvents did not become crystallized until about 300 seconds and the pulp powder was substantially swollen.

Basic Experiment 6

Pulp powder preheated to 40° C. was supplied into the respective supercooled liquid NMMO solvents kept at 40° C. that were the same as Basic experiment 5. It was found that the expansion degree of the preheated pulp powder was similar to that of the pulp powder in Basic experiment 5.

Basic Experiment 7

NMMO hydrates having water contents of 8%, 10.5%, 13%, 17%, 19% and 21% by weight were respectively heated and melted at their melting points, rapidly cooled at a cooling rate of 200° C./min and then kept at 50° C. Next, cellulose pulp powder at a room temperature was supplied into the respective liquid NMMO hydrate solvents supercooled. It was found that while the expansion degree of the preheated pulp powder was higher than that of the pulp powder in Basic experiment 6 and the respective liquid NMMO hydrate solvents are kept at their liquid states for 1800 seconds or more.

Basic Experiment 8

Pulp powder preheated to 50° C. was supplied into the respective supercooled liquid NMMO hydrates kept at 50° C. that were the same as Basic experiment 7. It was found that the expansion degree of the preheated pulp powder was higher than that of the pulp powder in Basic experiment 7, a part of the pulp powder was dissolved and the respective liquid NMMO hydrate solvents are kept at their liquid states for 1800 seconds or more.

Basic Experiment 9

NMMO hydrates having water contents of 10.5%, 13%, 17%, 19% and 21% by weight were respectively heated and melted at their melting points, rapidly cooled at a cooling rate of 20° C./min and then kept at 65° C. Next, cellulose pulp powder at a room temperature was supplied into the respective liquid NMMO hydrates. It was found that the pulp powder was swollen and dissolved in the liquid NMMO hydrate solvents having water contents of 10.5%, 13% and 17% by weight, the swollen pulp powder surface was somewhat dissolved in the liquid NMMO hydrate solvent having a water content of 19% by weight, and the pulp powder was only swollen in the liquid NMMO hydrate having a water content of 21% by weight.

Basic Experiment 10

NMMO hydrates having water contents of 10.5%, 13%, 17%, 19% and 21% by weight were respectively heated and melted at their melting points, rapidly cooled at a cooling rate of 20° C./min and then kept at 65° C. Next, cellulose pulp powder at a room temperature was supplied into the respective liquid NMMO hydrates. After pulp powder was as swollen as that of Basic Experiment 9, the respective mixtures were heated to 95° C. It was found that the pulp powder was swollen and fully dissolved at 95° C. in the liquid NMMO hydrate solvents having water contents of 10.5%, 13%, 17% and 19% by weight and the pulp powder was only swollen, without any dissolving process, in liquid NMMO hydrate having a water content of 21% by weight.

Basic Experiment 11—Comparative Experiment

NMMO hydrates having water contents of 10.5%, 13%, 17%, 19% and 21% by weight were respectively heated and melted at their melting points, and then kept at 95° C. without rapid cooling to compare with the present invention. Next, cellulose pulp powder at a room temperature was supplied into the respective liquid NMMO hydrates. It was, unlike Basic experiment 10, found that the pulp powder was not swollen but only the surface of the powder dissolved, that is, the powder was not fully dissolved at 95° C. in the liquid NMMO hydrate solvents having the water contents of 10.5%, 13% and 17% by weight and the pulp powder was only swollen, without any dissolving process, in the liquid NMMO hydrate having water contents of 19% and 21% by weight.

Basic Experiment 12

NMMO hydrates having water contents of 8%, 13%, 19%, 20% and 21% by weight were respectively heated and melted at their melting points and then rapidly cooled at a cooling rate of 20° C./min, and kept at a temperature of 65° C. Next, cellulose pulp powder at a room temperature was supplied into the respective liquid NMMO hydrates. After the pulp powder was as swollen as that of Basic experiment 9, the respective mixtures were heated to 150° C. It was found that the pulp powder was swollen and fully dissolved in the liquid NMMO hydrate solvents having water contents of 8%, 13% and 19% by weight and the pulp powder was only swollen, without any dissolving process, in the liquid NMMO hydrate having water contents of 20% and 21% by weight, even if it was heated to 150° C.

Preliminary Experiments

Swelling and Dissolution of Compressed Pulp Powder Whose Apparent Specific Gravity is Increased A sheet of normal pulp has an apparent specific gravity of 0.8, and if it is powdered, the pulp powder has different average diameters and apparent specific gravity in accordance with the kind of a tree. For instance, even if the conditions of milling were the same, the average diameter and apparent specific gravity of normal pulp powder of a needle-leaf tree became 50 mm and 0.08, and the average diameter and apparent specific gravity of normal pulp powder of a broadleaf tree became 16 mm and 0.05. Hence, in order to convey a predetermined amount of pulp powder in great quantities irrespective of the kind of a tree, pulp powder should be compressed, thereby increasing the apparent specific gravity thereof. Cellulose pulp powder was compressed in the twin-screw supplier with variable pitch (whose diameter, L/D and initial P/D were 45 mm, 7 and 1.5, respectively), where pitch interval 'P' was decreased in a convey advancing direction, and then supplied to the side of the first block of the twin-screw mixer (whose diameter and L/D are 60 mm and 20, respectively) (see FIGS. 4 and 7). A molten NMMO hydrate solvent having a water content in the range of 8% to 18% by weight was rapidly cooled to a temperature of 64° C. or 70° C. by using dried air at a room temperature. Then, the supercooled NMMO hydrate was injected on the top end of the first block of the twin-screw mixer (see FIGS. 4 to 6), followed by supply of compressed pulp powder. As apparent from FIG. 3, the liquid NMMO hydrate solvents supercooled to the temperatures of 64° C. and 70° C. respectively corresponded to the region where the irreversible swelling and dissolution of cellulose co-existed and the region where the dissolution of cellulose existed, so that the swelling and dissolution of cellulose were simultaneously generated. The temperatures corresponded to the solid phase moving region of the single-screw extruder connected for a continuous process with the twin-screw mixer. The following preliminary experiments were carried out in order to observe the swelling and dissolving behavior of cellulose powder in the liquid NMMO hydrate solvents in the single-screw extruder.

Preliminary Experiment 1

Liquid NMMO hydrate solvents supercooled to 64° C. and 70° C. were respectively injected in top end of the first block of the twin-screw mixer. Next, two kinds of powdered pulp having an apparent specific gravity of 0.05 (Sappi, a broad-leaf tree) and 0.08 (V-60, a needle-leaf tree) were respectively supplied at a predetermined amount thereof to the side of the first block of the twin-screw mixer by using a constant pitch twin-screw supplier. Swollen mixtures were obtained at the outlet of the twin-screw mixer whose entire sections were heated at the same temperature as of the supercooled liquid NMMO hydrate solvent. According to observation by a polarizing microscope, every mixture contained pulp powder swollen at both 64° C. and 70° C. irrespective of its tree kind. The swelling of pulp powder at 64° C. was greater than that at 70° C. The swollen mixtures were heated to a temperature of 95° C. on the polarizing microscope on which a hot stage was mounted, so that it was found that the swollen mixtures were all dissolved. The solutions, whose concentrations of cellulose were in the range of 5% by weight to 12% by weight, made respectively by passing the swollen mixtures in the single-screw extruder had a slightly deeper brown than those on the polarizing microscope.

Preliminary Experiment 2

The experiment conditions were made in the same method as in Preliminary experiment 1, except that in place of the constant pitch twin-screw supplier in Preliminary experiment 1, a variable pitch twin-screw supplier (refer to FIG. 7) is used, so that two kinds of powdered cellulose pulp having apparent specific gravity of 0.05 (Sappi) and 0.08 (V-60) were respectively adjusted to have the apparent specific gravity of 0.1. As a result, it was found that the solution made in this process was the same as Preliminary experiment 1.

Preliminary Experiment 3

The experiment conditions were made in the same method as in Preliminary experiment 2, except that two kinds of powdered cellulose pulp having apparent specific gravity of 0.05 (Sappi) and 0.08 (V-60) were respectively adjusted to have the apparent specific gravity of 0.2. As a result, it was found that the solution made in this process was the same as Preliminary experiment 1.

Preliminary Experiment 4

The experiment conditions were made in the same method as in Preliminary experiment 1, except that two kinds of powdered cellulose pulp having apparent specific gravity of 0.05 (Sappi) and 0.08 (V-60) were adjusted to have the apparent specific gravity of 0.27. It was found that every mixture contained powdered cellulose pulp swollen by the contact with the NMMO hydrate supercooled to 64° C. irrespective of their tree kind. However, Sappi was swollen in the liquid NMMO hydrate supercooled to 70° C. and if heated to 95° C., remained partly undissolved. On the other hand, V-60 was swollen in the liquid NMMO hydrate supercooled to 70° C., from which the same result as Preliminary experiment 1 was observed. If V-60 was heated to 95° C., the heating result was the same as Preliminary experiment 1.

Preliminary Experiment 5

The experiment conditions were made in the same method as in Preliminary experiment 1, except that one kind of powdered cellulose pulp having an apparent specific gravity of 0.05 (Sappi) was adjusted to have the apparent specific gravity of 0.3 and the other powdered cellulose pulp having an apparent specific gravity of 0.08 (V-60) was adjusted to have the apparent specific gravity of 0.45. It was found that both of powdered cellulose pulp were swollen by the contact with the liquid NMMO hydrate supercooled to 64° C. were swollen irrespective of their tree kind. However, both of powdered pulp were swollen only on their surfaces in the liquid NMMO hydrate supercooled to 70° C. irrespective of their tree kind. If they were heated to 95° C., they formed a film on their surfaces, so that both of powdered pulp of the latter were not completely dissolved.

It was appreciated from Preliminary experiments that as the apparent specific gravity of pulp powder was increased, powdered pulp was apt to form a gel film on its surface thereof in the liquid NMMO hydrate supercooled to 70° C. Thus it was difficult to be swollen and dissolved thereby. In case of Sappi having the apparent specific gravity of 0.3, if it was firstly contacted with the liquid NMMO solvent supercooled to 70° C., it formed a thin gel film on the surface thereof. As a result, if Sappi was heated to 95° C., it was not completely dissolved. To the contrary, Sappi was firstly contacted with the liquid NMMO solvent supercooled to 64° C., it does not form the gel film on the surface thereof, so that the solvent diffused into the interior of cellulose powder, thereby caused a high swelling of the cellulose powder.

Based upon the Preliminary experiments, the following experiments were carried out.

Experiment 1

A liquid NMMO monohydrate solvent (having a water content of 13.3% by weight) that was fully melted at 95° C. was supplied in a weight of 734 kg per hour to a gear pump. A convey pipe (having a diameter of 25.4 mm) was attached to a ring-shaped discharging outlet (having a diameter of 60 mm) comprised of 64 nozzle holes (each having a diameter of 0.1 mm) on the end portion thereof. The discharging hole installed a cooling air induction pipe on the center thereof, so that the solvent stream that was passed through the injection nozzles on the discharging outlet as shown in FIG. 5 met with a dried cooling air of 15° C. The cooling air stream was injected in an airflow per hour of 1400 m3 in every direction from cooling air injection nozzles, in a perpendicular direction thereto and as a result, the liquid NMMO monohydrate solvent was rapidly cooled to 50° C. (see FIG. 5). The supercooled liquid NMMO monohydrate solvent was injected on top end of the first block of the twin-screw mixer.

On the other hand, cellulose pulp (Sappi) powder having a degree of polymerization by weight (DPw) of 1050, an average diameter of 16 mm, an apparent specific gravity of 0.05 was passed through at a variable pitch twin-screw supplier (having a diameter of 45 mm, L/D of 7 and an initial P/D of 1.5) whose pitch interval 'P' was decreased in a convey advancing direction, so that cellulose pulp powder was compressed to have an apparent specific gravity of 0.3. Then, the compressed pulp powder at room temperature was supplied at a rate of 100 kg/hr to the side of the first block of the twin-screw mixer (having a diameter of 60 mm and L/D 20) (see FIGS. 4 and 7). The temperature set for the five blocks (see FIG. 4) of the twin-screw mixer 40° C. While passing through the five blocks, the compressed pulp powder and the supercooled liquid NMMO monohydrate solvent were conveyed and entirely mixed. A mixture of swollen powder thereby was produced by diffusion of the NMMO solvent into the interior of powdered pulp. The swollen powder was continuously conveyed to the single-screw extruder (having a diameter of 120 mm and L/D 30). The temperature distribution of the single-screw extruder was set at 60° C. in the solid phase moving region, at 90° C. in the dissolution region, at 100° C. in the dissolution moving region and at 100° C. in the die region. The safety limit pressure in the front end of the discharge region of the single-screw extruder was set to 70 atm. and the number of rotation per minute of the screw was 150. It was observed that the solution that was passed through the die region of the single-screw extruder was completely defoamed and dissolved. The color of the solution was yellow and the DPw of cellulose collected from the solution was 980. The AOOD of the NMMO water solution collected from the solution was 0.0008.

Experiment 2

The treatment conditions were made in the same method as in Experiment 1, except that a preheater was attached to the variable pitch twin-screw supplier and thus, pulp powder was heated to 40° C.

The solution that was passed through the die region of the single-screw extruder was completely dissolved in the same method as in Experiment 1, and the DPw of cellulose collected from the solution was almost same as Experiment 1. Also, the AOOD of the NMMO water solution collected from the solution was almost same as Experiment 1. When compared to Experiment 1, it was found that pulp powder at room temperature could be used, without any preheating to 40° C.

Experiment 3

The treatment conditions were made in the same method as in Experiment 1, except that the dried cooling air at 15° C. induced to the center of the discharging outlet was injected in an airflow per hour of 2100 m$^3$ and thus, a liquid NMMO monohydrate solvent rapidly cooled to 40° C. was obtained. The solution that was passed through the die region of the single-screw extruder was completely dissolved in the same manner as in Experiment 1, and the DPw of cellulose collected from the solution was almost same as Experiment 1. Also, the AOOD of the NMMO water solution collected from the solution was almost same as Experiment 1. It was found that the swelling region of cellulose had the same results when compared to Experiment 1.

Experiment 4

The treatment conditions were made in the same method as in Experiment 1, except that the dried cooling air at 15° C. was injected in an airflow per hour of 450 m$^3$ and thus, a liquid NMMO monohydrate solvent supercooled to 65° C. was obtained. The solution that was passed through the die region of the single-screw extruder had a slight deeper brown than that in Experiment 1. The solution had no problem in any spinning process. However, the DPw of cellulose collected from the solution was 950 and the AOOD of NMMO water solution collected from the solution was 0.0010.

Experiment 5

The treatment conditions were made in the same method as in Experiment 1, except that the cooling air was not induced from the center of the discharging outlet, but induced from the outside of NMMO solvent stream, to rapidly cool the NMMO solvent stream that was passed through the 64 nozzle holes (each having a diameter of 0.1 mm) of the discharging outlet, that is, the cooling air was induced to a ring hollow having 64 nozzle holes (each having a diameter of 0.06 mm) on the outside of NMMO solvent stream and each of the nozzle holes was formed to meet the cooling air with the solvent stream over 30°. The dried cooling air at 15° C. was supplied in an airflow per hour of 1140 m$^3$, and NMMO hydrate having a water content of 8% by weight melted at 135° C. to be supplied at a rate of 734 kg/hr and rapidly cooled to 65° C. by the dried cooling air. The solution that was passed through the die region of the single-screw extruder was completely dissolved in the same method as in Experiment 1 and exhibited slight higher viscosity and deeper brown than those in Experiment 1. The DPw of cellulose collected from the solution was 930 and the AOOD of NMMO water solution collected from the solution was 0.0011.

As described above, a process for preparing a homogeneous cellulose solution according to the present invention is capable of producing a mixture of cellulose pulp powder that is first swollen in a liquid NMMO hydrate solvent supercooled under its melting point by minimizing the dissolution of cellulose by the solvent and maximizing the swelling thereof by the solvent. Thus the process thereby produces a solution with maximum homogeneity and minimum decomposition of cellulose and the solvent. The process improves productivity and simplicity in the manufacture of cellulosic products by using the supercooled NMMO solvent in a liquid phase.

What is claimed is:

1. A process for preparing a homogeneous cellulose solution by using a liquid N-methylmorpholine-N-oxide hydrate solvent, said process consisting in sequence the steps of:

subjecting said liquid N-methylmorpholine-N-oxide hydrate solvent to rapid cooling to place said N-methylmorpholine-N-oxide hydrate solvent in a supercooled state, said supercooled state being under a melting point of said N-methylmorpholine-N-oxide hydrate solvent;

mixing said supercooled liquid N-methylmorpholine-N-oxide hydrate solvent with a cellulose pulp powder and swelling the resulting mixture; and, homogenizing said mixture.

2. The process of claim 1, wherein said supercooling step is carried out by injecting a cooling air stream to an injection stream of the liquid N-methylmorpholine-N-oxide hydrate solvent.

3. The process of claim 1, wherein the said liquid N-methylmorpholine-N-oxide hydrate solvent has a water content in the range of 8% by weight to 18% by weight.

4. The process of claim 1, wherein said liquid N-methylmorpholine-N-oxide hydrate solvent has a water content in the range of 8% by weight to 14% by weight.

5. The process of claim 1, wherein said liquid N-methyimorpholine-N-oxide hydrate solvent is rapidly cooled to a temperature of 65° C. or less during said supercooling step.

6. The process of claim 1, wherein said liquid N-methylmorpholine-N-oxide hydrate solvent is rapidly cooled to a temperature of 50° C. or less during said supercooling step.

7. The process of claim 1, wherein said liquid N-methylmorpholine-N-oxide hydrate solvent is rapidly cooled at a cooling rate of at least 60° C./min during said supercooling step.

8. The process of claim 1, wherein said cellulose pulp powder mixed with said supercooled liquid N-methylmorpholine-N-oxide hydrate solvent has a temperature range of between room temperature and 50° C.

9. The process of claim 1, wherein said cellulose pulp powder mixed with said supercooled liquid N-methylmorpholine-N-oxide hydrate solvent has a temperature range of between room temperature and 40° C.

10. The process of claim 1, wherein said pulp powder has a diameter of 1000 µm or less.

11. The process of claim 1, wherein said pulp powder has an apparent specific gravity in the range of 0.1 to 0.5.

12. The process of claim 1, wherein the mixing and swelling steps of the supercooled liquid N-methylmorpholine-N-oxide hydrate solvent and the pulp powder are carried out at a temperature range of between room temperature and 65° C.

13. A process for preparing a homogeneous cellulose solution by using a liquid N-methylmorpholine-N-oxide hydrate solvent, said process consisting in sequence the steps of:

subjecting said liquid N-methylmorpholine-N-oxide hydrate solvent to rapid cooling at a rate of at least 20° C./min to place said N-methylmorpholine-N-oxide hydrate solvent in a supercooled state, said supercooled state being under a melting point of said N-methylmorpholine-N-oxide hydrate solvent;

mixing said supercooled liquid N-methylmorpholine-N-oxide hydrate solvent with a cellulose pulp powder and swelling the resulting mixture; and, homogenizing said mixture.

* * * * *